US012749864B2

(12) United States Patent
Jonkers et al.

(10) Patent No.: US 12,749,864 B2
(45) Date of Patent: Sep. 29, 2026

(54) COOLING FOR GALVO MIRRORS IN LASER MATERIAL PROCESSING

(71) Applicant: II-VI Delaware, Inc., Wilmington, DE (US)

(72) Inventors: Jeroen Jonkers, Wilmington, DE (US); Axel Heinrici, Wilmington, DE (US); Patrick Kuehl, Wilmington, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 588 days.

(21) Appl. No.: 18/240,963

(22) Filed: Aug. 31, 2023

(65) Prior Publication Data

US 2024/0429670 A1 Dec. 26, 2024

(30) Foreign Application Priority Data

Jun. 22, 2023 (DE) ............................ 2023116380.9

(51) Int. Cl.
*H01S 3/04* (2006.01)

(52) U.S. Cl.
CPC .................................. *H01S 3/0401* (2013.01)

(58) Field of Classification Search
CPC ... H01S 3/0401; G02B 7/1821; G02B 7/1815; B23K 26/082
See application file for complete search history.

(56) References Cited

U.S. PATENT DOCUMENTS

| | | | | | |
|---|---|---|---|---|---|
| 3,708,223 | A * | 1/1973 | Sorensen | G02B 7/1815 | 165/47 |
| 4,175,835 | A * | 11/1979 | Kuhn, Jr. | H01S 3/0401 | 359/845 |
| 4,264,146 | A * | 4/1981 | Sutton | G02B 7/1815 | 359/845 |
| 4,772,110 | A * | 9/1988 | Roszhart | G02B 7/1815 | 359/845 |
| 5,303,081 | A * | 4/1994 | Totsuka | B23K 26/703 | 219/121.33 |

* cited by examiner

*Primary Examiner* — James A Dudek
(74) *Attorney, Agent, or Firm* — McAndrews Held & Malloy, Ltd.

(57) ABSTRACT

The present disclosure provides a system for cooling a mirror, comprising a rotatable mirror which is mounted on an axis of rotation and which has, behind a reflecting surface, at least one gas channel with an inlet and at least one outlet; and a static supply for a gas which has an outlet which is connected via a gap and thus contactlessly to the inlet of the gas channel of the rotatable mirror for supplying a gas. Furthermore, a method for cooling a mirror is disclosed, as well as the use of the system in a laser processing head.

17 Claims, 3 Drawing Sheets

COOLING FOR GALVO MIRRORS IN LASER MATERIAL PROCESSING

CROSS-REFERENCE TO RELATED APPLICATIONS

The present application claims priority to German Patent Application No. DE 10 2023 116 380.9 filed on Jun. 22, 2023. The aforementioned application is hereby incorporated by reference in its entirety.

FIELD OF THE DISCLOSURE

The present disclosure relates generally to a cooling system for galvo mirrors in laser material processing.

BACKGROUND OF THE DISCLOSURE

Laser processing systems comprise many optical elements. In certain laser material processing applications, so-called galvo mirrors are successfully used to deflect a laser beam. A galvo mirror is a mirror with a highly reflective coating that is connected to a galvanometer drive via an axis so that the mirror can be moved to deflect a laser beam.

One problem with the use of galvo mirrors is their thermal insulation. An increase in the temperature of the galvo mirrors can result in a restriction for the throughput of laser material processing.

Prior art galvo mirrors are known and made of glass, in which a small fraction of the laser light is transmitted that is not reflected by the highly reflective thin film coating. Furthermore, galvo mirrors made of materials with good thermal conductivity, such as aluminum, are known so that thermal gradients are flattened and the resulting deformation is minimized. Galvo mirrors are also made of special lightweight materials, such as beryllium or silicon carbide, to reduce their moment of inertia. The moment of inertia of all these prior art galvo mirrors can be reduced by special mechanical bracing on the back side.

The amount of heat to be dissipated by a galvo mirror is relatively small. For example, the reflectivity of the highly reflective coating is normally >99.5%, so that less than 50 W must be dissipated at 10 kW average laser power.

Cooling of the axis of a galvo mirror cannot be considered efficient, since this would only cool a small area of the mirror, and the motor shaft is only in contact with the mirror over a small area and heat could only be dissipated over this area to a very small extent and presumably also rather locally. With air cooling, power of up to 100 W can be dissipated in principle, although it is not sufficient to simply cool the back of a galvo mirror with a stream of air.

Another problem in cooling a galvo mirror arises from the fact that the mirror is moved and therefore a device for cooling the mirror must be adapted to the movement of the mirror.

SUMMARY OF THE DISCLOSURE

A technical problem to be solved by the present disclosure is therefore to provide an efficient cooling system for a galvo mirror.

Other aspects, features and advantages of the present disclosure will readily be apparent from the following detailed description, which simply sets forth preferred embodiments and implementations. The present disclosure may also be realized in other and different embodiments, and its various details may be modified in various obvious aspects, without departing from the teachings and scope of the present disclosure. Accordingly, the drawings and descriptions are to be considered illustrative and not limiting. Additional purposes and advantages of the disclosure are set forth in part in the following description and will become apparent in part from the description or may be inferred from the embodiment of the disclosure.

SUMMARY OF THE FIGURES

The disclosure is illustrated in more detail below with reference to figures. It will be obvious to those skilled in the art that these are only possible exemplary embodiments, without limiting the disclosure to the embodiments shown, wherein.

DETAILED DESCRIPTION OF THE DISCLOSURE

The present disclosure relates to a cooling system for a mirror, in particular a galvo mirror, to remove heat from the mirror. An example embodiment comprises introducing a gas into the surface behind the mirror. The gas is introduced either through the axis of rotation of the mirror or into an opening transverse to the axis of the mirror through a feed.

A technical advantage of this example embodiment is that a static feed is used for the movable mirror. Thus, a static part can be used to bring the gas inside the movable mirror without increasing the moment of inertia of the mirrors. The gas can flow out laterally to the reflecting surface of the mirror or flow out through an outlet between the feed and the mirror. The mirror has a cylindrical surface on its rear side, which surrounds the axis of rotation. The feed has a corresponding cylindrical bulge in which the cylindrical surface of the mirror is spaced apart. For efficient heat dissipation, distance between the mirror and the feed may be as small as possible, for example less than 1 mm, so that the gas flows into the cooling channel in the mirror and does not escape through the gap between the mirror and the feed. Thus, a small gap between the outlet of the feed and the inlet of the mirror efficiently introduces the gas into the channel of the mirror. In the case of an axial inlet (FIG. 3), the small gap is utilized for efficient heat dissipation because the gas would otherwise not flow at the hot surface.

The cooling is located at the axis of rotation, so adding mirror material cylindrically around the axis of rotation to improve heat transfer has no significant effect on the moment of inertia of the mirror. To improve the transition of the gas from the feed to the mirror, the gap between the feed and the mirror can be made even narrower so that the distance is less than. 0.1 mm. As long as the distance between the feed and the mirror is less than the diameter of the radial channels, sealing is not required.

Additional radial gas channels can be arranged inside the mirror to transport the gas laterally to the outside. This can be advantageous if the thermal conductivity of the mirror material is insufficient. These channels can be located inside the mirror or inside reinforcing structures on the backside of the highly reflective surface.

In another embodiment, the gas is fed directly into the axis of rotation to enter the feed channel of the mirror.

Figure 1:
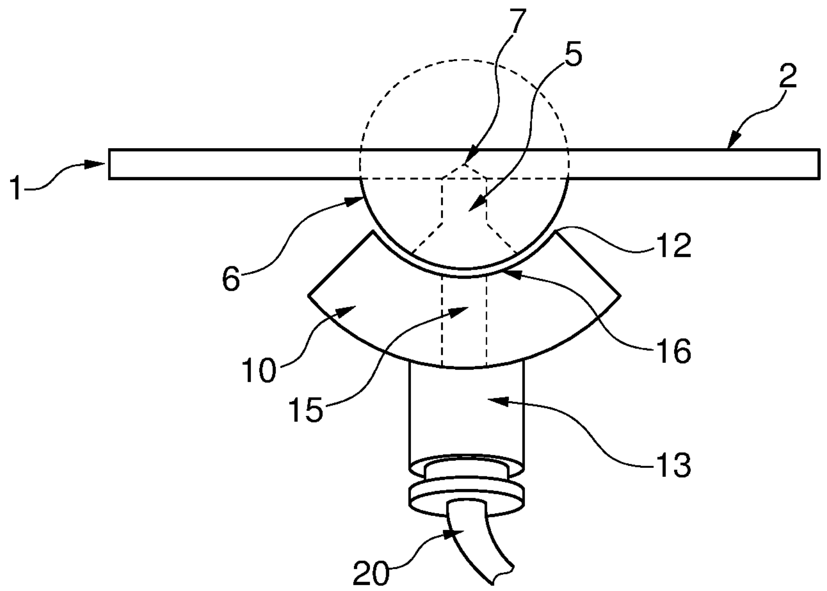
FIG. 1 shows a top view of a system of the present disclosure for cooling a galvo mirror.

FIG. 1 shows a top view of a system according to the present disclosure with a mirror 1, which can be moved around a shaft 7. On the rear side of a reflecting side 2 of the mirror 1 is arranged a cylindrical bulge 6, in which an inlet channel 5 is located. A feed 10 has a cylindrical recess 16, which surrounds the cylindrical bulge 6 of the mirror 1 with a gap. An outlet channel 15 is arranged in the cylindrical recess. According to the disclosure, it is provided that the channels extend in a tangential direction, i.e. along a gap as shown in FIG. 1. Inlet channel 5 and outlet channel 15 still overlap when the mirror is rotated, but inlet channel 5 is completely covered by a feed part 10 when it is rotated, which is why axial and tangential/angular expansion of inlet channel 5 and outlet channel 15 and feed part 10 is provided.

An attachment 13 for a hose 20 may be arranged at the rear of the feed. The gas is supplied via the hose 20. The gas may be air, which does not need to be cooled due to the hot mirror, since the use of excessively cool gas involves the risk of condensation on the mirror. For example, the system according to the disclosure can be used with air at room temperature.

Figure 2:
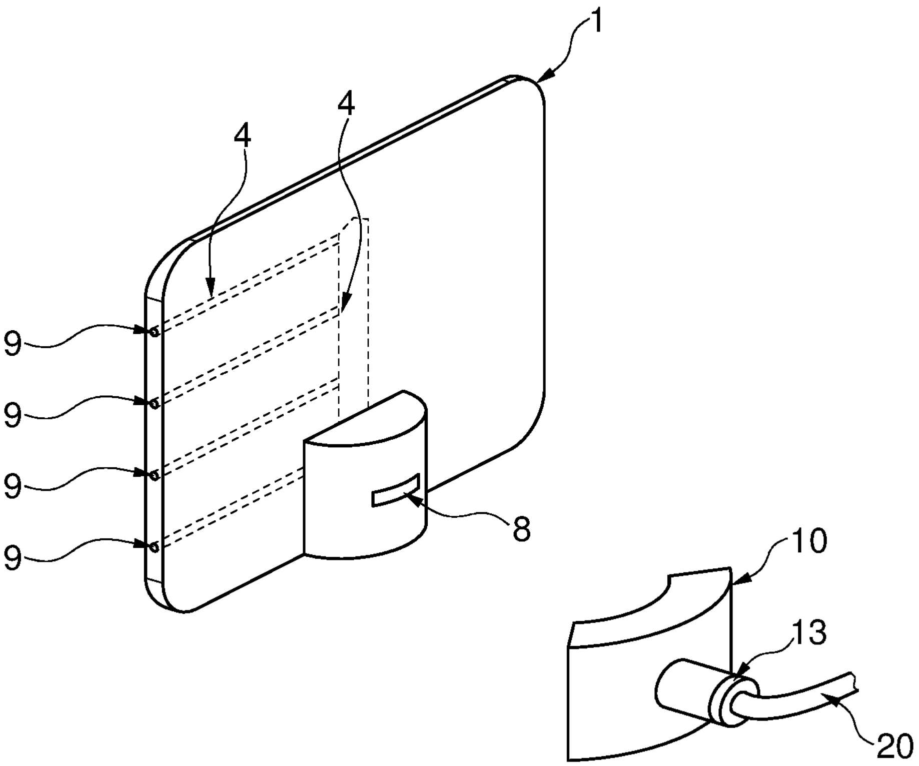
FIG. 2 shows a perspective view of a system of the present disclosure for cooling a galvo mirror.

FIG. 2 shows a perspective view of the components of the system, with the feed 10 moved away from the back of mirror 1 to allow a view of inlet 8 of inlet channel 5 (not visible). On the side of mirror 1, outlet 9 of exhaust channels 4, which are located inside the mirror, can be seen. On the rear side of the feed 10 is arranged an attachment 13 for a hose 20, with which the gas is fed.

Figure 3:
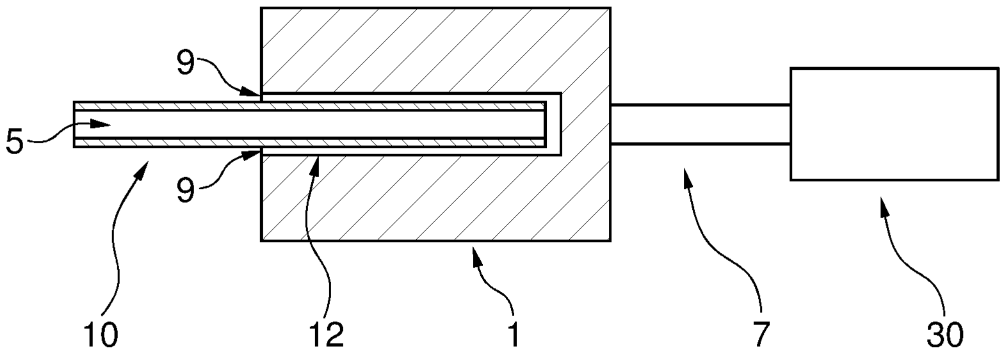
FIG. 3 shows a schematic diagram of a system with a static axis for introducing a gas for cooling into a rotatable mirror.

FIG. 3 shows an embodiment in which the mirror 1 is connected to a galvanometer 30 via a shaft 7. Mirror 1 and shaft 7 are rotated by galvanometer 30. The feed 10 is arranged statically and gas is supplied via inlet channel 5. Gap 12 between feed 10 and inlet channel 5 provides efficient cooling, with the gas leaving the substrate of the mirror again via outlet 9.

The present disclosure provides a system for cooling a mirror, comprising a rotatable mirror which is mounted on an axis of rotation and which has, behind a reflecting surface, at least one gas channel having an inlet and at least one outlet; and a static supply for a gas which has an outlet connected via a gap and thus contactless to the inlet of the gas channel of the rotatable mirror for supplying a gas.

In a further embodiment of the system according to the disclosure, it is provided that the static feed is arranged axially, radially, or parallel to the axis of rotation of the mirror.

According to another aspect of the disclosure, the mirror has on the side opposite to the reflecting side, a cylindrical bulge around the axis of rotation with an inlet channel, around which a corresponding cylindrical recess of the feed with an outlet channel is arranged.

Furthermore, the feed of a system according to the disclosure can have a hose connection on the side opposite to the cylindrical recess of the feed.

In a further embodiment of the system according to the disclosure, the inlet of the mirror may be arranged transversely to the axis of rotation.

It is further provided that the mirror is made of lightweight materials comprising beryllium, aluminum, silicon carbide.

Furthermore, the mirror of a system according to the disclosure may have support structures on the rear side towards the reflecting side, in which the at least one outlet is arranged.

The system of any one of claim 5 or 6, wherein the at least one outlet is disposed laterally of the mirror surface.

In a system according to the present disclosure, the distance between a cylindrical protrusion of the mirror and a cylindrical recess of the feeder may be less than 1 mm. An embodiment is also provided in which the distance is less than 0.1 mm.

In another embodiment of a system according to the present disclosure, the feeder may be arranged statically and the mirror may rotate within the cylindrical recess of the feeder.

Another aspect of the present disclosure relates to a method of cooling a mirror, comprising the steps of:

a. Arrangement of a static feed for a gas on a rotatable mirror, wherein at least one gas channel is arranged behind the reflecting surface of the mirror and the gas channel has an inlet which is connected via a gap and thus contactless to the inlet of the gas channel of the rotatable mirror for feeding a gas;
b. Introducing a gas via the feed into the at least one gas channel of the mirror; and
c. Discharging the gas via at least one outlet of the at least one gas channel of the mirror.

The method according to the disclosure may further comprise the step of rotating the mirror during the introduction and discharge of the gas.

Furthermore, in a process according to the disclosure, air may be used as the gas, which may be at room temperature.

In one embodiment of the process according to the disclosure, the gas can be discharged laterally from the mirror.

Another aspect of the disclosure relates to a method of using a system for the cooling of a galvo mirror in a laser processing head comprising the steps of arranging a rotatable mirror which is attached to an axis of rotation, and which has, behind a reflecting surface, at least one gas channel with an inlet and at least one outlet in the path of a laser beam of the laser processing head; and arranging a static feed for a gas, which has an outlet connected via a gap and thus contactless with the inlet of the gas channel of the rotatable mirror for feeding a gas in the laser processing head.

Other aspects, features and advantages of the present disclosure will readily be apparent from the following detailed description, which simply sets forth preferred embodiments and implementations. The present disclosure may also be realized in other and different embodiments, and its various details may be modified in various obvious aspects, without departing from the teachings and scope of the present disclosure. Accordingly, the drawings and descriptions are to be considered illustrative and not limiting. Additional purposes and advantages of the disclosure are set forth in part in the following description and will become apparent in part from the description or may be inferred from the embodiment of the disclosure.

What is claimed is:

1. A system for cooling a mirror comprising a rotatable mirror which is attached to an axis of rotation and which has, behind a reflecting surface, at least one gas channel with an inlet and at least one outlet; and a static feed for a gas, which has an outlet connected via a gap and thus contactless with the inlet of the gas channel of the rotatable mirror for feeding a gas.

2. The system of claim 1, wherein the static feed is arranged axially, radially, or parallel to the axis of rotation of the mirror.

3. The system of claim 1, wherein the mirror has, on the side opposite to the reflecting side, a cylindrical bulge around the axis of rotation with an inlet channel, around which a corresponding cylindrical recess of the feed with an outlet channel is arranged.

4. The system of claim 1, wherein the feed comprises a hose connector on the side opposite the cylindrical recess of the feed.

5. The system of claim 1, wherein the inlet of the mirror is arranged transverse to the axis of rotation.

6. The system of claim 1, wherein the mirror is made of lightweight materials comprising beryllium, aluminum, silicon carbide.

7. The system of claim 6, wherein the mirror has support structures on the back side toward the reflective side in which the at least one outlet is disposed.

8. The system of claim 1, wherein the at least one outlet is disposed laterally of the mirror surface.

9. The system of claim 1, wherein the distance between a cylindrical protrusion of the mirror and a cylindrical recess of the feeder is less than 1 mm.

10. The system of claim 9, wherein the distance is less than 0.1 mm.

11. The system of claim 1, wherein the feed is static and the mirror rotates within the cylindrical recess of the feed.

12. In a system comprising a static feed for a gas on a rotatable mirror, wherein at least one gas channel is arranged behind the reflecting surface of the mirror and the gas channel has an inlet which is connected via a gap and thus contactlessly to the inlet of the gas channel of the rotatable mirror for feeding a gas, a method of cooling a mirror, the method comprising:

- introducing a gas via the feed into the at least one gas channel of the mirror; and
- discharging the gas via at least one outlet of the at least one gas channel of the mirror.

13. The method of claim 12, wherein the mirror rotates during the introduction and discharge of the gas.

14. The method of claim 12, wherein the gas is air.

15. The method of claim 12, wherein the gas is at room temperature.

16. The method of claim 12, wherein the gas is discharged laterally from the mirror.

17. A method for enabling the cooling of a galvo mirror in a laser processing head comprising:

- arranging a rotatable mirror which is attached to an axis of rotation, and which has, behind a reflecting surface, at least one gas channel with an inlet and at least one outlet in the path of a laser beam of the laser processing head; and
  - arranging a static feed for a gas, which has an outlet connected via a gap and thus contactless with the inlet of the gas channel of the rotatable mirror for feeding a gas in the laser processing head.

* * * * *